INVENTOR.
Harris P. Kamide

United States Patent Office 3,050,611
Patented Aug. 21, 1962

3,050,611
TEMPERATURE CONTROL SYSTEMS
Harris P. Kamide, Franklin Park, Ill., assignor to General Electric Company, a corporation of New York
Filed Jan. 3, 1961, Ser. No. 80,423
14 Claims. (Cl. 219—20)

The present invention relates to electric heating systems and more particularly to improved control circuits for electric heating systems.

It is the general object of the present invention to provide in an electric heating system having two independent heating elements an improved control system that can independently control the power to the heating elements in accordance with the setting of two independent controllers operatively associated with the two heating elements.

Another object of the invention is to provide an improved electric heating system having two independent heating elements in which the power fed to the heating elements is controlled by a single silicon controlled rectifier.

Yet another object of the invention is to provide in an electric heating system of the type set forth an improved control circuit for applying the necessary control signals to the control terminal of the silicon controlled rectifier whereby the power fed to the two heating elements of the heating system can be separately controlled by two separate controllers operatively associated with the respective heating elements.

Still another object of the invention is to provide in an improved electric heating system of the type set forth improved control circuits which permit independent control of the power supplied to the two heating elements from a single source of A.C. electric power.

Yet another object of the invention is to provide in an improved electric heating system of the type set forth improved control circuits which permit independent control of the power supplied to the two heating elements from two sources of A.C. electric power displaced in phase substantially 180° with respect to each other.

A further object of the invention is to provide an improved electric heating system of the type set forth which is simple and economical in construction and involves a minimum number of individual conventional elements.

Further features of the invention pertain to the particular arrangement of the elements of the electric heating system and of the associated control networks and circuits, whereby the above-outlined and additional operating features thereof are attained.

The invention both as to its organization and method of operation, together with further objects and advantages thereof, will best be understood by reference to the following specification taken in connection with the accompanying drawings, in which.

Figure 1:
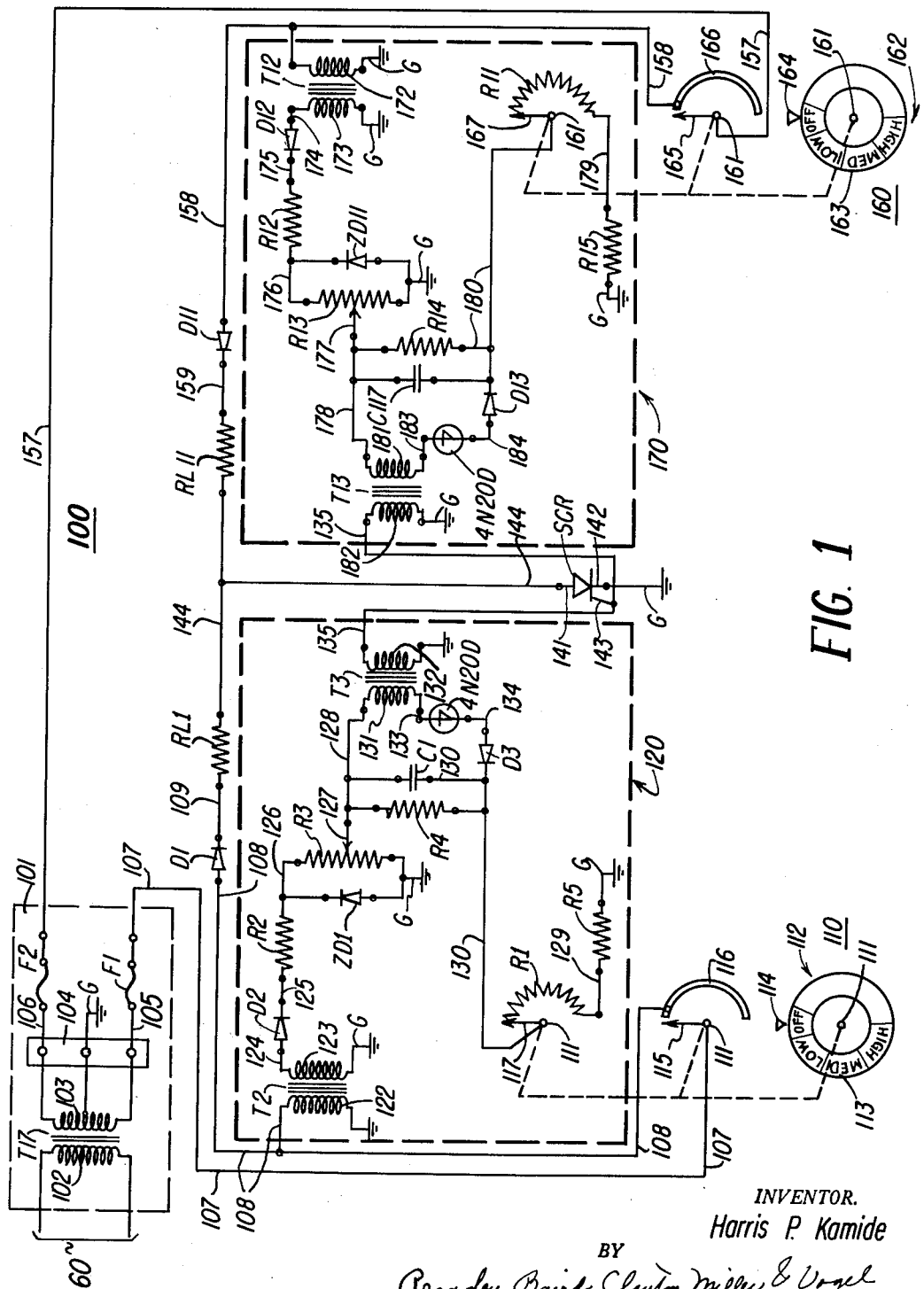
FIGURE 1 is a circuit diagram of one preferred embodiment of electric heating system and the control circuits therefor made in accordance with and embodying therein the principles of the present invention.

Referring to FIG. 1 of the drawings, there is diagrammatically illustrated in a circuit diagram a first preferred embodiment of an electric heating system 100 made in accordance with and embodying therein the features of the present invention, the system 100 comprising generally a power source 101, a first heating element RL1 having a controller 110 and a control circuit 120 associated therewith, and a second heating element RL11 having a second controller 160 and a control circuit 170 associated therewith, the heating elements RL1 and RL11 being connected to conduct through a single silicon controlled rectifier SCR.

The power source 101 comprises a power transformer T1 having a primary winding 102 supplied by suitable 60 cycle A.C. power and a secondary winding 103 provided with a center tap and connected to a terminal block 104. The output from the terminal block 104 is a three-wire Edison source of 236 volts single phase, A.C. including two outside lines 105 and 106 and a grounded neutral line G. The outside lines 105 and 106 are respectively connected to fuses F1 and F2 which are in turn connected to lines 107 and 157. The line 107 is in turn connected to a switch forming a part of the manually operable controller generally designated by the numeral 110. The controller 110 comprises a rotatably mounted operating shaft 111 carrying a manual dial or knob 112 on the outer end thereof and provided with indicia 113 cooperating with an index marker 114. More particularly, the controller 110 comprises "Off," "Low," "Medium" and "High" positions that correspond to respective portions of the indicia 113 carried by the manual dial 112 and cooperating with the index marker 114 and also correspond to temperatures of the medium heated by the heating element RL1. Further, the rotatable shaft 111 of the controller 110 carries two wipers 115 and 117 that are simultaneously adjusted as the manual knob 112 is rotated. The wiper 115 comprises a portion of a switch including a cooperating conducting segment 116; and the wiper 117 comprises a portion of a variable resistance including a resistor element R2 adapted to make electrical contact with the wiper 117. When the manual dial 112 is operated to its "Off" position, the wipers 115 and 117 respectively disengage the conducting segment 116 and the resistor R2. When the manual dial 112 is rotated in the clockwise direction out of its "Off" position about 10°, the wiper 115 engages the conducting segment 116 and the wiper 117 engages the resistor R2. Continued rotation of the manual dial 112 through 170° in a clockwise direction maintains the wiper 115 in contact with the conducting segment 116 and moves the wiper 117 to different points along the resistor R2.

Rotation of the manual dial 112 in a clockwise direction whereby to place the wiper 115 in contact with the conducting segment 116 serves to connect the potential on the line 107 through the wiper 115 to conducting segment 116 which in turn applies the full potential to a line 108 which supplies operating potentials for the control circuit 120 and the heating element RL1. More specifically, the line 108 is connected to one terminal of a first blocking rectifier D1 which has the other terminal thereof connected to one terminal of the heating element RL1 by means of a line 109. The rectifier D1 has been illustrated as a silicon diode rectifier but it is to be understood that any other suitable rectifier may be used in its place. The heating element RL1 has been illustrated as a resistor although other heating elements may be used in its place. The other terminal of the heating element RL1 is connected by a line 144 to one of the power terminals 141 of the silicon controlled rectifier SCR, the rectifier SCR having a second power terminal 142 connected to ground to the conductor G and having a control terminal 143. The silicon controlled rectifier SCR is more particularly a solid state rectifier comprising four rectifying junctions in series, namely p-n-p-n with the power terminals 141 and 142 connected to the terminal p and n junctions and with the control terminal or gate 143 connected to the intermediate p junction. The rectifier SCR is characterized by having a high impedance to the flow of current between the terminals 141 and 142 in both directions when so signal is applied to the control terminal 143 and by having a low impedance between the power terminals 141 and 142 when a predetermined signal or pulse is applied to the control terminal 143.

Power for operating the heating element RL1 can be obtained from the line 108 when a suitable control signal is applied to the control terminal 143 of the rectifier SCR, the rectifier D1 being poled in a direction to permit flow of current through the heating element RL1 and the rectifier SCR. The control signal for the control terminal 143 permitting the application of power to the heating element RL1 is developed by the control circuit 120. Power for operating the control circuit 120 is derived from the line 108 and is applied as the input to a transformer T2, and more particularly to the primary winding 122 thereof, the line 108 being connected to one terminal of the primary winding 122 and the other terminal of the primary winding 122 being grounded through the line G. The secondary winding 126 of the transformer T2 has one terminal thereof connected by a line 124 to one terminal of a silicon diode rectifier D2, the other terminal of the rectifier D2 being connected by a line 125 to a voltage divider network including two rectifiers R2 and R3 connected in series by a line 126 to ground. In a typical operating example the A.C. input voltage to the primary winding 122 may be 236 volts and the secondary voltage developed across the winding 123 is 60 volts R.M.S. which when applied to the silicon rectifier D2 provides a half wave rectified output therefrom which is developed across the voltage divider network including R2 and R3. Connected in parallel with the resistor R3 to ground is a Zener diode ZD1 which is characterized by conduction when a voltage of a specified magnitude is applied across the terminals thereof, the diode ZD1 being of the type which becomes highly conductive when a potential of 28 volts is applied between the terminals thereof. As a result the potential across the rectifier R3 is shunted by the Zener diode ZD1 which clips or limits the voltage peaks of the voltage thereacross at 28 volts.

The resistor R3 is provided with a wiper 127 which is connected to a line 128 whereby a portion of the potential developed across the resistor R3 can be applied through the line 128 to a charging circuit for a charging capacitor C1. More specifically, a resistance network is provided from the line 128 to ground through a first resistor R4 connected by a line 130 to the wiper 117, through the portion of the resistor R1 between the wiper 117 and a line 129 connected to the other end thereof, and a resistor R5 connected between the line 129 and ground. The capacitor C1 is connected in parallel with the resistor R4 and more particularly has one terminal thereof connected to the line 128 and the other terminal thereof connected to the line 130. Connected in parallel with the capacitor C1 is a discharge circuit for the capacitor C1 including the primary winding 131 of a pulse transformer T3, a Shockley diode 4N20D and a blocking silicon diode D3, the line 128 being connected to one terminal of the winding 131, the other terminal of the winding 131 being connected by a line 133 to one terminal of the Shockley diode, the other terminal of the Shockley diode being connected by a line 134 to one terminal of the rectifier of the rectifier D3, and the other terminal of the rectifier D3 being connected to the line 130. The Shockley diode 4N20D is a four layer solid state device including junctions arranged in the order p-n-p-n and characterized by having a high impedance of the order of one million ohms to the passage of current therethrough until a potential of a predetermined value is impressed thereacross and having an impedance of one ohm to the passage of current therethrough upon the application of the potential of predetermined value and of the proper polarity to the input terminals thereof, the diode 4N20D requiring a potential of 20 volts thereacross to cause heavy conduction therethrough, this being called the "avalanche" voltage thereof. The pulse transformer T3 has a secondary winding 132 having one terminal thereof grounded through the line G and having the other terminal thereof connected by a line 135 to the control terminal 143 of the rectifier SCR.

Figure 2:
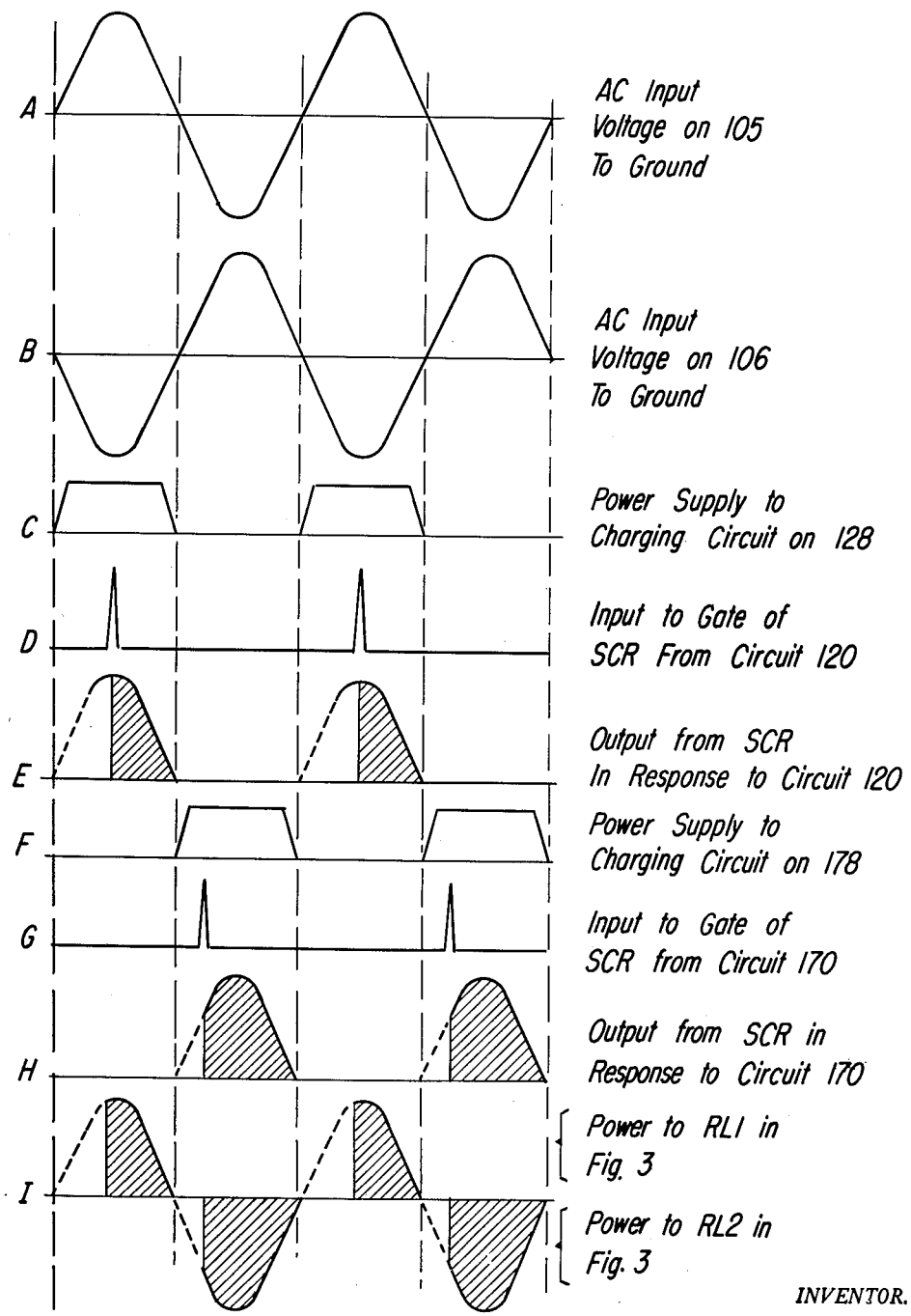
FIG. 2 is a graphic illustration of the voltages obtained at different points in the circuit of FIG. 1 during the operation thereof and illustrating particularly the phase relationship among the voltages.

The operation of the control circuit 120 will now be described with reference also to FIGS. 2A, C, D and E of the drawings. The potential between the line 105 and ground is illustrated in FIG. 2A and upon operating the controller 110 to move the manual dial 112 thereof from the "Off" to the "Low" position, for example, the wiper 115 carrying the potential shown in FIG. 2A makes contact with the conducting segment 116 and thereby applies to the primary winding 122 of the transformer T2 the voltage of FIG. 2A. A corresponding voltage is generated in the secondary winding 123 and is applied to the rectifier D2 whereby to produce on the wiper 127 and on the line 128 a clipped rectified voltage having the shape illustrated in FIG. 2C of the drawings, it being noted that an output is obtained on the line 128 only for the corresponding positive half cycles of the input wave form on line 105 as illustrated in FIG. 2A. The potential of FIG. 2C is applied across the resistive network including the resistors R4, R1 and R5 to ground, these resistors also forming a charge circuit for the charging capacitor C1, the voltage applied to the capacitor C1 being that portion of the potential between the line 128 and ground which appears across the resistor R4. The potential across the resistor R4 can be varied by moving the wiper 117 to different points upon the resistor R1, the potential across the resistor R4 being relatively low when a large fraction of the resistance of the resistor R1 is in the charging circuit and the potential across the resistor R4 being relatively large when a small portion or none of the resistance of the resistor R1 is in the charging circuit. The potential across the resistor R4 has a wave form like that of FIG. 2C and serves to charge the capacitor C1 at a rate proportional to the amplitude of the applied potential. When the voltage on the capacitor C4 reaches the avalanche voltage for the Shockley diode 4N20D, conduction immediately occurs through the primary winding 131 of the transformer T2, the Shockey diode, and the blocking diode D3. Conduction through the Shockley diode generates a positive going sharp voltage potential on the conductor 135 having the general configuration illustrated in FIG. 2D of the drawings, whereby to cause conduction of the rectifier SCR.

The application of the pulse of FIG. 2D to the control terminal or gate 143 of the rectifier SCR causes conduction thereof when the leading edge of the form of FIG. 2D has reached a predetermined value. When the rectifier SCR becomes conductive, a circuit for the first heating element RL1 is established from the input line 105 through the fuse F1, the line 107, the wiper 115, the conducting segment 116, the line 108, the blocking rectifier D1, the line 109, the heating element RL1, the line 144, and the rectifier SCR to ground. The portion of the power pulse shaded in FIG. 2E is that applied across the heating element RL1, it being noted that only the positive going half cycle appears across the heating element RL1, the negative cycles being blocked by the rectifiers D1 and SCR. The portion of the positive half cycles supplied as operating power for the heating element RL1 is determined by the time of conduction of the rectifier SCR during the positive half cycles and this in turn is determined by the time that the gating pulses of FIG. 2D are applied to the control terminal thereof. In turn the time phase relationship of the leading edge of the gating signals of FIG. 2D to the positive half cycles of the power source of FIG. 2A is determined by the control circuit 120 and more particularly by the phase shift introduced by the RC network which in turn is determined by the position of the wiper 117 along the resistor R2, the position of the wiper 117 being controlled by the position of the manual dial 112 of the controller 110. Accordingly, it is seen that the controller 110 can effectively control the energizations of the heating element RL1 and it is found that the control can be over a range corresponding to about 160° of each positive half cycle of the power supply illustrated in FIG. 2A, thereby to vary the power to the heating element RL1 in a continuous and infinitely variable manner from substantially zero power to the maximum power obtainable.

The second heating element RL11 is provided with its own associated controller 160 which is identical in construction to the controller 110 described above. More particularly the controller 160 includes a rotatable operating shaft 161 carrying a manual dial 162 and wiper blades 165 and 167. The manual dial 162 has indicia 163 thereon cooperating with an indicator 164. The wiper 165 cooperates with a conducting segment 166, the wiper 165 being connected to the second power line 157 and the conducting segment 166 being connected to a line 158 supplying power to the second heating element RL11 and the control circuit 170. More specifically, the line 158 is connected to one terminal of a blocking rectifier D11 which may be identical in construction to the rectifier D1, the other terminal of the rectifier D11 being connected by a line 159 to one terminal of the second heating element RL11, the other terminal of the heating element RL11 being connected by the line 144 to the power terminal 141 of the rectifier SCR.

The control circuit 170 is identical in construction to the control circuit 120 described above and more specifically includes a transformer T12 provided with a primary winding 172 and a secondary winding 173, one terminal of the primary winding 172 being connected to the power line 158 and the other terminal thereof being grounded. One terminal of the secondary winding 173 is grounded through the line G and the other terminal thereof is connected by a line 174 to a rectifier D12 which corresponds to the rectifier D2 described above. The other terminal of the rectifier D12 is connected by a line 175 to a voltage divider network including a resistor R12 connected by a line 176 to a resistor R13 having the other terminal thereof grounded through the line G. Disposed in parallel with the resistor R13 is a Zener diode ZD11 having one terminal thereof connected to ground and the other terminal thereof connected to the line 176. A wiper 177 is provided for the resistor R13 and is connected across a charging circuit in the form of a series of resistors; more specifically a line 178 connects the wiper 177 to one terminal of the resistor R14 having the other terminal connected to a line 180 that is in turn connected to the wiper 167; the wiper 167 is adapted to engage the resistor R12 as explained above and one end of the resistor R12 is connected by a line 179 to one terminal of a resistor R15 having the other terminal thereof grounded through the conductor G. A charging capacitor C11 is connected in parallel with the resistor R14 and more particularly has one terminal thereof connected to the line 178 and has the other terminal thereof connected to the line 180. Disposed in parallel with the capacitor C11 is a discharge circuit therefor including the primary winding 181 of a pulse transformer T13 like the transformer T3 described above, a Shockley diode 4N20D and a blocking diode D13; more particularly, the conductor 178 is connected to one terminal of the winding 181 which has the other terminal thereof connected by a line 183 to one terminal of the Shockley diode, the other terminal of the Shockley diode being connected by a line 184 to one terminal of the blocking diode D13 which has the other terminal thereof connected to the line 180. The transformer T13 has a secondary winding 182 which has one terminal thereof grounded through the conductor G and has the other terminal thereof connected by the line 135 to the control terminal 143 of the rectifier SCR.

The operation of the control circuit 170 is identical to the operation of the control circuit 120 described above. More specifically, the potential between the line 106 and ground illustrated in FIG. 2B of the drawings is applied through the wiper 165 and the conducting segment 166 to the line 158 when the controller 160 is operated to move the manual dial 162 thereof from the "Off" position to the "Low" position thereof, for example. A corresponding voltage is developed in the secondary winding 173 of the transformer T12, this voltage being rectified by the rectifier D12 and developed across the resistor network including R12 and R13. That portion of the potential appearing across the resistor R13 is clipped by the Zener diode ZD11 and a part thereof is applied by the wiper 177 to the line 178. The potential on the line 178 is applied across the resistance network including the resistors R12, R14 and R15. The charging potential for the charging capacitor C11 is that portion of the potential between the line 178 and ground which appears across the resistor R14, this potential being relatively small when a large portion of the resistor R12 is in the charging circuit and the potential being relatively large when little or none of the resistance of the resistor R12 is in the charging circuit. When the potential on the capacitor C11 reaches the avalanche voltage of the Shockley diode 4N20D, the capacitor is discharged through the circuit including the winding 181, the Shockley diode and the blocking rectifier D13. The discharge of the capacitor C11 produces a pulse in the secondary winding 182 of the pulse transformer T13 which is applied along the line 135 to the control terminal 143 of the rectifier SCR, this pulse having the configuration illustrated in FIG. 2G of the drawings. When the pulses in FIG. 2G are applied to the control terminal 143 of the rectifier SCR, it conducts through the second heating element RL11, the operating potential applied to the second heating element RL11 being that illustrated in FIG. 2H of the drawings and particularly the shaded portion of only the positive half cycles of the input voltage illustrated in FIG. 2B.

The amount of power applied to and consequently the heat derived from the two heating elements RL1 and RL11 can be controlled independently and varied in a continuous manner from substantially zero to maximum power by operation of the corresponding controllers 110 and 160, the amount of power applied to each of the two heating elements being independent of the power supplied to the other, the variable control being obtained by the use of a common rectifier SCR. For example, assuming that the cook wishes to carry out a medium temperature cooking operation utilizing the heating element RL1 and wishes to carry out a high temperature cooking operation utilizing the heating element RL11, the controller 110 can be adjusted to place substantially half of the resistance of the resistor R1 between the wiper 117 and the line 128 and the controller 160 can be adjusted to place substantially none or only a small amount of the resistance of the resistor R11 between the wiper 167 and the line 179. Operation of the manual dial 112 will also apply power to the control circuit 120 and its associated power circuit for the heating element RL1 and operation of the manual dial 162 will supply operating potential to the control circuit 170 and to the power circuit for the second heating element RL11, the phase relationship between the potentials being that illustrated in FIGS. 2A and 2B, it being noted that the two applied potentials are 180° out of phase with each other. As a consequence, the charging potentials for the charging capacitors C1 and C11 illustrated in FIGS. 2C and 2F, respective, will also be disposed 180° out of phase with each other. Since about half of the resistance of the resistor R1 is inserted in the charging circuit for the capacitor C1, the Shockley diode will discharge at approximately the midpoint of the half cycles of the applied operating voltage of FIG. 2A and more specifically will conduct at a time which represents a substantial time phase delay between the leading edge of the output pulse illustrated in FIG. 2D and the leading edge of the corresponding power potential illustrated in FIG. 2A. As a consequence of applying the potential of FIG. 2D to the control terminal 143, the rectifier SCR will conduct from the line 108 through the blocking rectifier D1 and the first heating element RL1 to ground during that portion of the applied power potential of FIG. 2A occurring between the application of the control pulses of FIG. 2D to the gate 143 of the rectifier SCR and the end of the positive half cycles of FIG. 2A. More particularly, the rectifier SCR begins to conduct immediately upon application of the control signals 2D through the control terminal 143 thereof and continues to conduct until the applied power potential of FIG. 2A reaches zero and begins to go negative; at this point the rectifier SCR automatically ceases conduction as a result of the application of the power voltage of FIG. 2A thereto.

The control circuit 170 immediately thereafter proceeds to generate the second control signals occurring near the beginning of the positive half cycles of the second power supply illustrated in FIG. 2B since the charging potential for the charging capacitor C11 is substantially maximum, substantially none of the resistance of the resistor R12 being in the charging circuit. As soon as the second control signals of FIG. 2G are applied to the control terminal 143 of the rectifier SCR, it begins to conduct through a circuit made from the power line 158 through the blocking rectifier D11 and the second heating element RL11 to ground. The power supplied to the second heating element RL11 is that portion of the positive going half cycles occurring after the application of the second control signals of FIG. 2G to the control terminal 143 and more specifically the shaded portions of the positive half cycles illustrated in FIG. 2H of the drawings. The blocking diode D1 effectively prevents conduction through the heating element RL1 during the negative cycles of the voltage of FIG. 2A, i.e., during the positive cycles of the voltage signals in FIG. 2B, and the blocking rectifier D11 correspondingly positively prevents conduction through the second heating element RL11 during the negative cycles of the voltage of FIG. 2B, i.e., the positive half cycles of the voltage of FIG. 2A. As a result, power for operation of the first heating element RL1 is available only during the positive going half cycles of the potential of FIG. 2A and the power for operation of the second heating element RL11 is available only during the positive half cycles of the potential of FIG. 2B, the rectifier SCR controlling conduction through the first heating element RL1 during a first series of positive half cycles of the applied potential from line 105 and controlling conduction through the second heating element RL11 during the second series of positive half cycles of the applied potential from line 106. The amount of power applied at each of the heating elements can be varied and controlled from substantially zero power to full power by means of the controllers 110 and 160.

Figure 3:
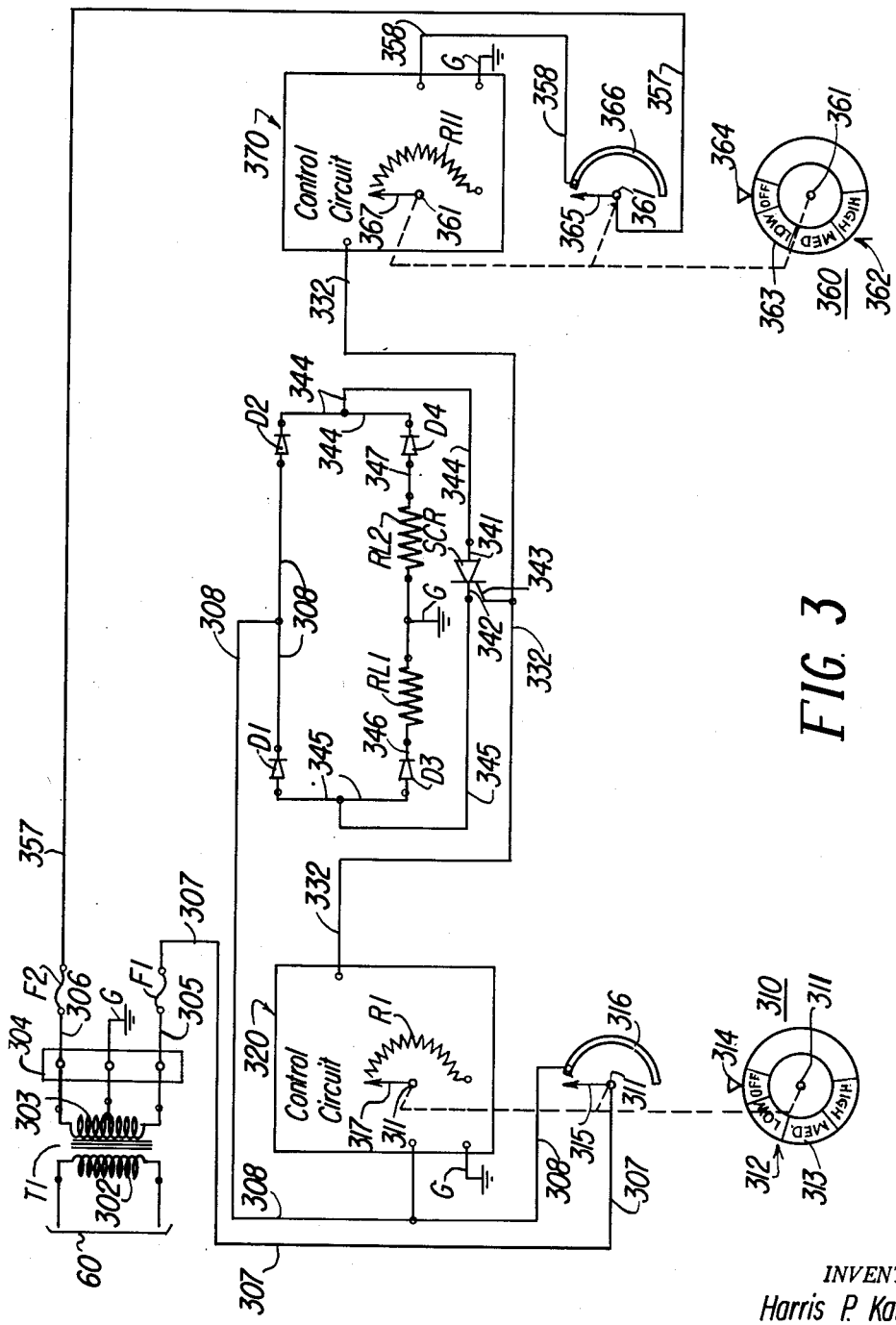
FIG. 3 is a circuit diagram, partly in block form and illustrating another embodiment of an electric heating system made in accordance with the present invention.

There is shown in FIG. 3 of the drawings a second embodiment of the present invention wherein two heating elements RL1 and RL2 can be controlled from a single rectifier SCR supplied from a single applied potential such as the voltage of FIG. 2A. Each of the heating elements RL1 and RL2 is provided with its individual and independent controller 310 and 360, respectively, the controllers 310 and 360 being identical in construction to the controllers 110 and 160 described heretofore. Power for operation of the circuit of FIG. 3 is obtained from a power transformer T1 having a primary winding 302 and a secondary winding 303 connecting to a terminal block 304. A first potential is developed between a line 305 and a grounded center tap on the secondary winding 303, this potential being applied through a fuse F1 to a power line 307, the potential on the line 307 being that illustrated in FIG. 2A of the drawings and being utilized to energize a control circuit 320 identical to the control circuit 120 described above and to operate a Wheatstone bridge including the heating elements RL1 and RL2. A second potential from the transformer T1 is developed between a line 306 and ground, this potential being applied through a fuse F2 to a line 157 and being that illustrated in FIG. 2B of the drawings, this potential being 180° out of phase with respect to the potential on the line 307 and being utilized only to energize a control circuit 370 identical to the control circuit 170 described above.

The controller 310 includes a rotatable operating shaft 311 carrying a manual dial 312 having indicia 313 thereon cooperating with an indicator 314. Mounted on the shaft 311 is a first wiper 315 connected to the line 307 and adapted to cooperate with a conducting segment 316 connected to a line 308. A second wiper 317 is mounted upon the shaft 311 and is adapted to cooperate with a resistor R1 forming a part of the control circuit 320. The control circuit 320 derives operating potential from the line 308 and is operative to produce as an output therefrom on a line 332 a first set of control signals occurring in alternate half cycles and during the positive going half cycles of the power potential of FIG. 2A, the first set of positive control signals being applied along the line 332 to the control terminal 343 of the rectifier SCR.

The second controller 360 includes a rotatable operating shaft 361 having a manual dial 362 thereon provided with indicia 363 adapted to cooperate with an indicator 364. Also mounted upon the shaft 361 is a first wiper 365 having the line 357 connected thereto and adapted to contact a conducting segment 366 to which is connected a line 358. A second wiper 367 is mounted on the shaft 361 and is adapted to contact a resistor R11 forming a part of the control circuit 370. The control circuit 370 is identical to the control circuit 170 described above and produces as an output therefrom on the line 332 a second set of positive going control signals illustrated in FIG. 2G of the drawings and occurring during the negative half cycles of the power voltage of FIG. 2A, this second set of control signals also being applied to the control terminal of the rectifier SCR.

The two heating elements RL1 and RL2 are disposed in legs of a Wheatstone bridge which includes a pair of input terminals, one of which is connected to the power supply line 308 and the other one of which is connected to ground through the conductor G. There are two output terminals on the Wheatstone bridge, one being connected to a conductor 344 and the other being connected to a conductor 345. The rectifier SCR illustrated in FIG. 3 has two power terminals 341 and 342 which are connected respectively to the lines 344 and 345 connected to the output points of the Wheatstone bridge. The control terminal 343 of the rectifier SCR is connected to the line 342 carrying the output control signals from the control circuits 320 and 370. Disposed in the first leg of the Wheatstone bridge between the lines 308 and 345 is a first blocking rectifier D1 and disposed in the second leg of the Wheatstone bridge between the lines 308 and 344 is a second blocking rectifier D2, the rectifiers D1 and D2 being poled in opposite directions. The third leg of the Wheatstone bridge between the conductor 345 and ground includes a third blocking rectifier D3 having one terminal thereof connected to the line 345 and the other terminal thereof connected by a line 346 to one terminal of the first heating element RL1, the other terminal of the heating element being connected to ground. The fourth leg of the Wheatstone bridge includes a fourth blocking rectifier D4 having one terminal thereof connected to the line 344 and the other terminal thereof connected by a line 347 to one terminal of the second heating element RL2, the other terminal of the heating element RL2 being grounded. The rectifier D3 is poled in the same direction as the rectifier D1 and the rectifier D4 is poled in the same direction as the rectifier D2.

In the operation of the electrical heating system of FIG. 3, a first path for conduction through the first heating element RL1 during the positive half cycles of the power voltage of FIG. 2A can be established from the line 308 through the blocking rectifier D2, the line 344, the rectifier SCR, the line 345, the blocking rectifier D3, the line 346, and the first heating element RL1 to ground, it being noted that the rectifier D1 in this case blocks conduction through the associated leg of the Wheatstone bridge and that the rectifier D4 prevents conduction through its associated leg of the Wheatstone bridge. A second path for conduction during the negative going half cycles of the power voltage of FIG. 2A can be established from the line 308 through the blocking rectifier D1, the line 345, the rectifier SCR, the line 344, the blocking rectifier D3, the line 347 and the second heating element RL2 to the ground line G, it being noted that the blocking rectifiers D2 and D3 positively prevent conduction through the first heating element RL1 during the negative half cycles of the power input of FIG. 2A. Summarizing, conduction through the first heating element RL1 and the rectifier SCR is possible during the positive half cycles of the power voltage illustrated in FIG. 2A and conduction through the second heating element RL2 in the rectifier SCR is possible during the negative half cycles of the power voltage of FIG. 2A, no conduction through the first heating element RL1 being possible during the negative half cycles of the applied power potential and no conduction through the second heating element RL2 being possible during the positive half cycles of the applied power potential.

The portion of the available power half cycles actually applied to the heating elements RL1 and RL2 is determined by the setting of the associated controllers 310 and 360, respectively, the controllers in turn shifting the time phase of the control signals from the control circuits 320 and 370, respectively, that are fed to the control terminal 343 of the rectifier SCR. Assuming that the cook desires to have a medium cooking operation carried out by heat from the first heating element RL1, the controller 310 can have the manual dial 312 thereof adjusted to the medium position whereby to place substantially half of the resistance of the resistor R1 in the charge circuit whereby to produce a first series of control signals of the type illustrated in FIG. 2D occurring slightly before the 90° point of the power wave form during the positive half cycles thereof. Further assuming that the cook desires to carry out a heating operation at high temperature utilizing the second heating element RL2, the controller 360 has the manual dial 362 thereof adjusted to the high position whereby substantially little or none of the resistance of the resistor R11 is placed in the charge circuit so that the second set of control signals from the controller 370 occur early in each of the negative half cycles of the power source. As a result of the above operation, the heating element RL1 will have approximately one-half of each positive half cycle applied thereto through the rectifier SCR and the second heating element RL2 will have substantially all of the negative half cycles of the input voltage applied thereto through the rectifier SCR, this being diagrammatically illustrated in FIG. 2I wherein it is noted that about half of each of the positive half cycles of the input wave form is shaded indicating utilization thereof by the heating element RL1 and substantially all of the negative half cycles of the input wave form are shaded indicating utilization thereof by the second heating element RL2. It further will be noted that the portion of the positive half cycles developed across the first heating element RL1 can be continuously varied from substantially zero to substantially full power by adjustment of the controller 310 and independent of the setting of the controller 360 and independent of the power developed across the second heating element RL2. Likewise the power developed across the heating element RL2 can be continuously varied from substantially zero to substantially full power independently of the setting of the controller 310 and independent of the power developed in the first heating element RL1, the current for both the heating elements RL1 and RL2 flowing through and being controlled by the same rectifier SCR.

Accordingly, it is apparent that there has been provided in an electric heating system of the type including two independent heating elements having associated independent controllers therefor improved circuit networks for selectively establishing within a relatively wide temperature range the heat derived from the two heating elements, the amount of heat derived from each heating element being independent of each other and being substantially continuously variable from about zero to about full power independently of the controller for the other heating element and the power fed to the other heating element, the control being achieved utilizing a single silicon controlled rectifier.

While there has been described what is at present considered to be certain preferred embodiments of the invention, it will be understood that various modifications may be made therein and it is intended to cover in the appended claims all such modifications that fall within the true spirit and scope of the invention.

What is claimed is:

1. In an electric heating system including a first heating element, a first manually operable controller selectively operative to set different desired temperatures of the medium heated by said first heating element, a second heating element, a second manually operable controller selectively operative to set different desired temperatures of the medium heated by said second heating element, and a source of A.C. electric power; the combination comprising a solid state controlled rectifier having a pair of power terminals and a control terminal and characterized by conduction between the power terminals thereof in response to the application of a control signal to the control terminal thereof, a first blocking rectifier for said first heating element, a second blocking rectifier for said second heating element, a network connecting the power terminals of said solid state controlled rectifier and said first and second blocking rectifiers and said first and second heating elements to said source of power respectively so that the power supplied to said first and second heating elements is dependent upon the state of conduction of said solid state controlled rectifier and the states of conduction of said first and second blocking rectifiers respectively, said first and second blocking rectifiers being poled to conduct current in the same direction through said solid state controlled rectifier, a first control circuit selectively governed by the temperature setting of said first controller and selectively operative to produce during the positive half cycles of said power source corresponding first control signals, a second control circuit selectively governed by the temperature setting of said second controller and selectively operative to produce during the negative half cycles of said power source corresponding second control signals; and means for impressing said first and second control signals alternately upon the control terminal of said solid state controlled rectifier so as to govern the alternate conductions between the power terminals thereof and the consequent alternate energizations of said first and second heating elements.

2. In an electric heating system including a first heating element, a first manually operable controller selectively operative to set different desired temperatures of the medium heated by said first heating element, a second heating element, a second manually operable controller selectively operative to set different desired temperatures of the medium heated by said second heating element, and a source of A.C. electric power; the combination comprising a solid state controlled rectifier having a pair of power terminals and a control terminal and characterized by conduction between the power terminals thereof in response to the application of a control signal to the control terminal thereof, a first blocking rectifier for said first heating element, a second blocking rectifier for said second heating element, a network connecting the power terminals of said solid state controlled rectifier and said first and second blocking rectifiers and said first and second heating elements to said source of power respectively so that the power supplied to said first and second heating elements is dependent upon the state of conduction of said solid state controlled rectifier and the states of conduction of said first and second blocking rectifiers respectively, said first and second blocking rectifiers being poled to conduct current in the same direction through said solid state controlled rectifier, a first control circuit operated from said power source and selectively governed by the temperature setting of said first controller and selectively operative to produce during the positive half cycles of said power source corresponding first control signals having a predetermined relationship to the corresponding half cycles of said power source, a second control circuit operated from said power source and selectively governed by the temperature setting of said second controller and selectively operative to produce during the negative half cycles of said power source corresponding second control signals having a predetermined relationship to the corresponding half cycles of said power source, and means for impressing said first and second control signals alternately upon the control terminal of said solid state controlled rectifier so as to govern the alternate conductions between the power terminals thereof and the consequent alternate energizations of said first and second heating elements.

3. In an electric heating system including a first heating element, a first manually operable controller selectively operative to set different desired temperatures of the medium heated by said first heating element, a second heating element, a second manually operable controller selectively operative to set different desired temperatures of the medium heated by said second heating element, and a source of A.C. electric power; the combination comprising a solid state controlled rectifier having a pair of power terminals and a control terminal and characterized by conduction between the power terminals thereof in response to the application of a control signal to the control terminal thereof, a first blocking rectifier for said first heating element, a second blocking rectifier for said second heating element, a network connecting the power terminals of said solid state controlled rectifier and said first and second blocking rectifiers and said first and second heating elements to said source of power respectively so that the power supplied to said first and second heating elements is dependent upon the state of conduction of said solid state controlled rectifier and the states of conduction of said first and second blocking rectifiers respectively, said first and second blocking rectifiers being poled to conduct current in the same direction through said solid state controlled rectifier, a first control circuit operated from said power source and selectively governed by the temperature setting of said first controller and selectively operative to produce during the positive half cycles of said power source corresponding first control signals having a predetermined time phase relationship to the corresponding half cycles of said power source, a second control circuit operated from said power source and selectively governed by the temperature setting of said second controller and selectively operative to produce during the negative half cycles of said power source corresponding second control signals having a predetermined time phase relationship to the corresponding half cycles of said power source, and means for impressing said first and second control signals alternately upon the control terminal of said solid state controlled rectifier so as to govern the alternate conductions between the power terminals thereof and the consequent alternate energizations of said first and second heating elements.

4. In an electric heating system including a first heating element, a first manually operable controller selectively operative to set different desired temperatures of the medium heated by said first heating element, a second heating element, a second manually operable controller selectively operative to set different desired temperatures of the medium heated by said second heating element, and a source of A.C. electric power; the combination comprising a solid state controlled rectifier having a pair of power terminals and a control terminal and characterized by conduction between the power terminals thereof in response to the application of a control signal to the control terminal thereof, a first blocking rectifier for said first heating element, a second blocking rectifier for said second heating element, a network connecting the power terminals of said solid state controlled rectifier and said first blocking rectifier and said first heating element to said source of power in a first heating circuit and connecting the power terminals of said solid state controlled rectifier and said second blocking rectifier and said second heating element to said source of power in a second heating circuit so that the power supplied to said first and second heating elements is dependent upon the state of conduction of said solid state controlled rectifier and the states of conduction of said first and second blocking rectifiers, said first and second blocking rectifiers being poled to conduct current in the same direction through said solid state controlled rectifier, a first control circuit selectively governed by the temperature setting of said first controller and selectively operative to produce during the positive half cycles of said power source corresponding first control signals, a second control circuit selectively governed by the temperature setting of said second controller and selectively operative to produce during the negative half cycles of said power source corresponding second control signals, and means for impressing said first and second control signals alternately upon the control terminal of said solid state controlled rectifier so as to govern the alternate conductions between the power terminals thereof and the consequent alternate energizations of said first and second heating elements.

5. In an electric heating system including a first heating element, a first manually operable controller selectively operative to set different desired temperatures of the medium heated by said first heating element, a second heating element, a second manually operable controller selectively operative to set different desired temperatures of the medium heated by said second heating element, and a source of A.C. electric power; the combination comprising a solid state controlled rectifier having a pair of power terminals and a control terminal and characterized by conduction between the power terminals thereof in response to the application of a control signal to the control terminal thereof, a first blocking rectifier for said first heating element, a second blocking rectifier for said second heating element, a network connecting the power terminals of said solid state controlled rectifier and said first blocking rectifier and said first heating element to said source of power in a first heating circuit and connecting the power terminals of said solid state controlled rectifier and said second blocking rectifier and said second heating element to said source of power in a second heating circuit so that the power supplied to said first and second heating elements is dependent upon the state of conduction of said solid state controlled rectifier and the states of conduction of said first and second blocking rectifiers, said first and second blocking rectifiers being poled to conduct current in the same direction through said solid state controlled rectifier, a first control circuit operated from said power source and selectively governed by the temperature setting of said first controller and selectively operative to produce during the positive half cycles of said power source corresponding first control signals having a predetermined time phase relationship to the corresponding half cycles of said power source, a second control circuit operated from said power source and selectively governed by the temperature setting of said second controller and selectively operative to produce during the negative half cycles of said power source corresponding second control signals having a predetermined time phase relationship to the corresponding half cycles of said power source, and means for impressing said first and second control signals alternately upon the control terminal of said solid state controlled rectifier so as to govern the alternate conductions between the power terminals thereof and through the corresponding first and second heating circuits respectively and the consequent alternate energizations of said first and second heating elements.

6. In an electric heating system including a first heating element, a first manually operable controller selectively operative to set different desired temperatures of the medium heated by said first heating element, a second heating element, a second manually operable controller selectively operative to set different desired temperatures of the medium heated by said second heating element, and first and second sources of A.C. electric power displaced substantially 180° out of phase with respect to each other; the combination comprising a solid state controlled rectifier having a pair of power terminals and a control terminal and characterized by conduction between the power terminals thereof in response to the application of a control signal to the control terminal thereof, a first blocking rectifier for said first heating element, a second blocking rectifier for said second heating element, a network connecting the power terminals of said solid state controlled rectifier and said first and said second blocking rectifiers and said first and second heating elements to said first and second sources of A.C. electric power respectively so that the power supplied to said first and second heating elements is dependent upon the state of conduction of said solid state controlled rectifier and the states of conduction of said first and second blocking rectifiers respectively, said first and second blocking rectifiers being poled to conduct current in the same direction through said solid state controlled rectifier, a first control circuit selectively governed by the temperature setting of said first controller and selectively operative to produce corresponding first control signals, a second control circuit selectively governed by the temperature setting of said second controller and selectively operative to produce corresponding second control signals, and means for impressing said first and second control signals alternately upon the control terminal of said solid state controlled rectifier so as to govern the alternate conductions between the power terminals thereof and the consequent alternate energizations of said first and second heating elements.

7. In an electric heating system including a first heating element, a first manually operable controller selectively operative to set different desired temperatures of the medium heated by said first heating element, a second heating element, a second manually operable controller selectively operative to set different desired temperatures of the medium heated by said second heating element, and first and second sources of A.C. electric power displaced substantially 180° out of phase with respect to each other; the combination comprising a solid state controlled rectifier having a pair of power terminals and a control terminal and characterized by conduction between the power terminals thereof in response to the application of a control signal to the control terminal thereof, a first blocking rectifier for said first heating element, a second blocking rectifier for said second heating element, a network connecting the power terminals of said solid state controlled rectifier and said first and said second blocking rectifiers and said first and second heating elements to said first and second sources of A.C. electric power respectively so that the power supplied to said first and second heating elements is dependent upon the state of conduction of said solid state controlled rectifier and the states of conduction of said first and second blocking rectifiers respectively, said first and second blocking rectifiers being poled to conduct current in the same direction through said solid state controlled rectifier, a first control circuit operated from said first power source and selectively governed by the temperature setting of said first controller and selectively operative to produce corresponding first control signals having a predetermined time phase relationship to the corresponding half cycles of said first power source, a second control circuit operated from said second power source and selectively governed by the temperature setting of said second controller and selectively operative to produce corresponding second control signals having a predetermined time phase relationship to the corresponding half cycles of said second power source, and means for impressing said first and second control signals alternately upon the control terminal of said solid state controlled rectifier so as to govern the alternate conductoins between the power terminals thereof for the time intervals between the application of the said first and second control signals to the control terminal and the end of the corresponding half cycles of said first and second power sources and the consequent alternate energizations of said first and second heating elements.

8. In an electric heating system including a first heating element, a first manually operable controller selectively operative to set different desired temperatures of the medium heated by said first heating element, a second heating element, a second manually operable controller selectively operative to set different desired temperatures of the medium heated by said second heating element, and first and second sources of A.C. electric power displaced substantially 180° out of phase with respect to each other; the combination comprising a solid state controlled rectifier having a pair of power terminals and a control terminal and characterized by conduction between the power terminals thereof in response to the application of a control signal to the control terminal thereof, a first blocking rectifier for said first heating element, a second blocking rectifier for said second heating element, a network connecting the power terminals of said solid state controlled rectifier and said first and said second blocking rectifiers and said first and second heating elements to said first and second sources of A.C. electric power respectively so that the power supplied to said first and second heating elements is dependent upon the state of conduction of said solid state controlled rectifier and the states of conduction of said first and second blocking rectifiers respectively, said first and second blocking rectifiers being poled to conduct current in the same direction through said solid state controlled rectifier, a first control circuit operated from said first power source and selectively governed by the temperature setting of said first controller and selectively operative to produce corresponding first control signals for alternate half cycles of said first power source and having a predetermined time phase relationship to the corresponding half cycles of said first power source, a second control circuit operated from said second power source and selectively governed by the temperature setting of said second controller and selectively operative to produce corresponding second control signals for alternate half cycles of said second power source and having a predetermined time phase relationship to the corresponding half cycles of said second power source, said alternate half cycles of said first power source and said alternate half cycles of said second power source being displaced 180° with respect to each other, and means for impressing said first and second control signals alternately upon the control terminal of said solid state controlled rectifier so as to govern the alternate conductions between the power terminals thereof for the time intervals between the application of the said first and second control signals to the control terminal and the end of the corresponding half cycles of said first and second power sources and the consequent alternate energizations of said first and second heating elements.

9. In an electric heating system including a first heating element, a first manually operable controller selectively operative to set different desired temperatures of the medium heated by said first heating element, a second heating element, a second manually operable controller selectively operative to set different desired temperatures of the medium heated by said second heating element, and first and second sources of A.C. electric power displaced substantially 180° out of phase with respect to each other; the combination comprising a solid state controlled rectifier having a pair of power terminals and a control terminal and characterized by conduction between the power terminals thereof in response to the application of a control signal to the control terminal thereof, a first blocking rectifier for said first heating element, a second blocking rectifier for said second heating element, a network connecting the power terminals of said solid state controlled rectifier and said first blocking rectifier and said first heating element to said first source of power in a first heating circuit and connecting the power terminals of said solid state controlled rectifier and said second blocking rectifier and said second heating element to said second source of power in a second heating circuit so that the power supplied to said first and second heating elements is dependent upon the state of conduction of said solid state controlled rectifier and the states of conduction of said first and second blocking rectifiers, said first and second blocking rectifiers being poled to conduct current in the same direction through said solid state controlled rectifier, a first control circuit selectively governed by the temperature setting of said first controller and selectively operative to produce corresponding first control signals, a second control circuit selectively governed by the temperature setting of said second controller and selectively operative to produce corresponding second control signals, and means for impressing said first and second control signals alternately upon the control terminal of said solid state controlled rectifier so as to govern the alternate conductions between the power terminals thereof and the consequent alternate energizations of said first and second heating elements.

10. In an electric heating system including a first heating element, a first manually operable controller selectively operative to set different desired temperatures of the medium heated by said first heating element, a second heating element, a second manually operable controller selectively operative to set different desired temperatures of the medium heated by said second heating element, and first and second sources of A.C. electric power displaced substantially 180° out of phase with respect to each other; the combination comprising a solid state controlled rectifier having a pair of power terminals and a control terminal and characterized by conduction between the power terminals thereof in response to the application of a control signal to the control terminal thereof, a first blocking rectifier for said first heating element, a second blocking rectifier for said second heating element, a network connecting the power terminals of said solid state controlled rectifier and said first blocking rectifier and said first heating element to said first source of power in a first heating circuit and connecting the power terminals of said solid state controlled rectifier and said second blocking rectifier and said second heating element to said second source of power in a second heating circuit so that the power supplied to said first and second heating elements is dependent upon the state of conduction of said solid state controlled rectifier and the states of conduction of said first and second blocking rectifiers, said first and second blocking rectifiers being poled to conduct current in the same direction through said solid state controlled rectifier, a first control circuit operated from said first power source and selectively governed by the temperature setting of said first controller and selectively operative to produce corresponding first control signals having a predetermined time phase relationship to the corresponding half cycles of said first power source, a second control circuit operated from said second power source and selectively governed by the temperature setting of said second controller and selectively operative to produce corresponding second control signals having a predetermined time phase relationship to the corresponding half cycles of said second power source, and means for impressing said first and second control signals alternately upon the control terminal of said solid state controlled rectifier so as to govern the alternate conductions between the power terminals thereof for the time intervals between the application of the said first and second control signals to the control terminal and the end of the corresponding half cycles of said first and second power sources and the consequent alternate energizations of said first and second heating elements.

11. In an electric heating system including a first heating element, a first manually operable controller selectively operative to set different desired temperatures of the medium heated by said first heating element, a second heating element, a second manually operable controller selectively operative to set different desired temperatures of the medium heated by said second heating element, and first and second sources of A.C. electric power displaced substantially 180° out of phase with respect to each other; the combination comprising a solid state controlled rectifier having a pair of power terminals and a control terminal and characterized by conduction between the power terminals thereof in response to the application of a control signal to the control terminal thereof, a first blocking rectifier for said first heating element, a second blocking rectifier for said second heating element, a network connecting the power terminals of said solid state controlled rectifier and said first blocking rectifier and said first heating element to said first source of power in a first heating circuit and connecting the power terminals of said solid state controlled rectifier and said second blocking rectifier and said second heating element to said second source of power in a second heating circuit so that the power supplied to said first and second heating elements is dependent upon the state of conduction of said solid state controlled rectifier and the states of conduction of said first and second blocking rectifiers, said first and second blocking rectifiers being poled to conduct current in the same direction through said solid state controlled rectifier, a first control circuit operated from said first power source and selectively governed by the temperature setting of said first controller and selectively operative to produce corresponding first control signals for alternate half cycles of said first power source and having a predetermined time phase relationship to the corresponding half cycles of said first power source, a second control circuit operated from said second power source and selectively governed by the temperature setting of said second controller and selectively operative to produce corresponding second control signals for alternate half cycles of said second power source and having a predetermined time phase relationship to the corresponding half cycles of said second power source, said alternate half cycles of said first power source and said alternate half cycles of said second power source being displaced 180° with respect to each other, and means for impressing said first and second control signals alternately upon the control terminal of said solid state controlled rectifier so as to govern the alternate conductions between the power terminals thereof for the time intervals between the application of the said first and second control signals to the control terminal and the end of the corresponding half cycles of said first and second power sources and the consequent alternate energizations of said first and second heating elements.

12. In an electric heating system including a first heating element, a first manually operable controller selectively operative to set different desired temperatures of the medium heated by said first heating element, a second heating element, a second manually operable controller selectively operative to set different desired temperatures of the medium heated by said second heating element, and a source of A.C. electric power; the combination comprising a solid state controlled rectifier having a pair of power terminals and a control terminal and characterized by conduction between the power terminals thereof in response to the application of a control signal to the control terminal thereof, first and second blocking rectifiers for said first heating element, third and fourth blocking rectifiers for said second heating element, a Wheatstone bridge network having first and second input terminals and first and second output terminals, said first blocking rectifier being connected between said first input terminal and said second output terminal and said third blocking rectifier being connected between said first input terminal and said first output terminal, said second blocking rectifier and said first heating element being connected in series between said first output terminal and said second input terminal, said fourth blocking rectifier and said second heating element being connected in series between said second output terminal and second input terminal, said source of power being connected to said input terminals and the power terminals of said solid state controlled rectifier being connected to said output terminals, said first and second blocking rectifiers being poled in the same direction and said third and fourth rectifiers being poled in the same direction, a first control circuit selectively governed by the temperature setting of said first controller and selectively operative to produce during the positive half cycles of said power source corresponding first control signals, a second control circuit selectively governed by the temperature setting of said second controller and selectively operative to produce during the negative half cycles of said power source corresponding second control signals, and means for impressing said first and second control signals alternately upon the control terminal of said solid state controlled rectifier so as to govern the alternate conductions between the power terminals thereof and the consequent alternate energizations of said first and second heating elements.

13. In an electric heating system including a first heating element, a first manually operable controller selectively operative to set different desired temperatures of the medium heated by said first heating element, a second heating element, a second manually operable controller selectively operative to set different desired temperatures of the medium heated by said second heating element, and a source of A.C. electric power; the combination comprising a solid state controlled rectifier having a pair of power terminals and a control terminal and characterized by conduction between the power terminals thereof in response to the application of a control signal to the control terminal thereof, first and second blocking rectifiers for said first heating element, third and fourth blocking rectifiers for said second heating element, a Wheatstone bridge network having first and second input terminals and first and second output terminals, said first blocking rectifier being connected between said first input terminal and said second output terminal and said third blocking rectifier being connected between said first input terminal and said first output terminal, said second blocking rectifier and said first heating element being connected in series between said first output terminal and said second input terminal, said fourth blocking rectifier and said second heating element being connected in series between said second output terminal and second input terminal, said source of power being connected to said input terminals and the power terminals of said solid state controlled rectifier being connected to said output terminals, said first and second blocking rectifiers being poled in the same direction and said third and fourth rectifiers being poled in the same direction, a first control circuit operated from said power source and selectively governed by the temperature setting of said first controller and selectively operative to produce during the positive half cycles of said power source corresponding first control signals having a predetermined relationship to the corresponding half cycles of said power source, a second control circuit operated from said power source and selectively governed by the temperature setting of said second controller and selectively operative to produce during the negative half cycles of said power source corresponding second control signals having a predetermined relationship to the corresponding half cycles of said power source, and means for impressing said first and second control signals alternately upon the control terminal of said solid state controlled rectifier so as to govern the alternate conductions between the power terminals thereof and the consequent alternate energizations of said first and second heating elements.

14. In an electric heating system including a first heating element, a first manually operable controller selectively operative to set different desired temperatures of the medium heated by said first heating element, a second heating element, a second manually operable controller selectively operative to set different desired temperatures of the medium heated by said second heating element, and a source of A.C. electric power; the combination comprising a solid state controlled rectifier having a pair of power terminals and a control terminal and characterized by conduction between the power terminals thereof in response to the application of a control signal to the control terminal thereof, first and second blocking rectifiers for said first heating element, third and fourth blocking rectifiers for said second heating element, a Wheatstone bridge network having first and second input terminals and first and second output terminals, said first blocking rectifier being connected between said first input terminal and said second output terminal and said third blocking rectifier being connected between said first input terminal and said first output terminal, said second blocking rectifier and said first heating element being connected in series between said first output terminal and said second input terminal, said fourth blocking rectifier and said second heating element being connected in series between said second output terminal and second input terminal, said source of power being connected to said input terminals and the power terminals of said solid state controlled rectifier being connected to said output terminals, said first and second blocking rectifiers being poled in the same direction and said third and fourth rectifiers being poled in the same direction, a first control circuit operated from said power source and selectively governed by the temperature setting of said first controller and selectively operative to produce during the positive half cycles of said power source corresponding first control signals having a predetermined time phase relationship to the corresponding half cycles of said power source, a second control circuit operated from said power source and selectively governed by the temperature setting of said second controller and selectively operative to produce during the negative half cycles of said power source corresponding second control signals having a predetermined time phase relationship to the corresponding half cycles of said power source, and means for impressing said first and second control signals alternately upon the control terminal of said solid state controlled rectifier so as to govern the alternate conductions between the power terminals thereof and through the corresponding first and second heating circuits respectively and the consequent alternate energizations of said first and second heating elements.

References Cited in the file of this patent

UNITED STATES PATENTS

| | | |
|---|---|---|
| 2,822,455 | Molyneaux et al. | Feb. 4, 1958 |
| 3,012,126 | Ferguson | Dec. 5, 1961 |